(12) United States Patent
Riccitelli

(10) Patent No.: US 7,516,586 B2
(45) Date of Patent: Apr. 14, 2009

(54) HIDDEN DECK FASTENER SYSTEM

(75) Inventor: Martin G. Riccitelli, Agawam, MA (US)

(73) Assignee: Handy & Harman, Rye, NY (US)

( * ) Notice: Subject to any disclaimer, the term of this patent is extended or adjusted under 35 U.S.C. 154(b) by 123 days.

(21) Appl. No.: 11/506,684

(22) Filed: Aug. 18, 2006

(65) Prior Publication Data
US 2007/0056243 A1  Mar. 15, 2007

Related U.S. Application Data

(60) Provisional application No. 60/709,635, filed on Aug. 19, 2005.

(51) Int. Cl.
*E04B 2/00* (2006.01)
(52) U.S. Cl. .............. 52/586.1; 52/582.1; 52/650.3
(58) Field of Classification Search ............. 52/586.1, 52/712, 714, 709, 782.1, 459, 698, 483.1, 52/582.1, 650.3, 392, 391, 489.1, 489.2; 403/232.1; D8/71; 411/458, 459, 461, 921, 411/356, 358
See application file for complete search history.

(56) References Cited

U.S. PATENT DOCUMENTS

| | | | | |
|---|---|---|---|---|
| 4,198,175 A | * | 4/1980 | Knepp et al. | 403/191 |
| 4,296,580 A | | 10/1981 | Weinar | 52/281 |
| 4,599,842 A | * | 7/1986 | Counihan | 52/586.2 |
| 4,620,403 A | * | 11/1986 | Field | 52/480 |
| 4,844,651 A | | 7/1989 | Partridge | 403/406.1 |
| 4,925,141 A | * | 5/1990 | Classen | 248/217.2 |
| 4,965,980 A | * | 10/1990 | Leavens | 52/712 |
| 5,027,573 A | * | 7/1991 | Commins et al. | 52/489.2 |
| 5,339,581 A | | 8/1994 | Schlickenmeyer | 52/177 |
| 5,394,667 A | | 3/1995 | Nystrom | 52/480 |
| 5,412,915 A | | 5/1995 | Johnson | 52/177 |
| 5,497,593 A | | 3/1996 | Riesberg | 52/702 |
| 5,775,048 A | | 7/1998 | Orchard | 52/712 |
| 5,842,319 A | | 12/1998 | Ravetto | 52/715 |
| 6,071,054 A | | 6/2000 | Tebo | 411/459 |
| 6,128,880 A | | 10/2000 | Meenan, Jr. | 52/489.1 |
| 6,170,212 B1 | | 1/2001 | Suchyna et al. | 52/480 |
| 6,250,186 B1 | | 6/2001 | O'Berry | 81/451 |
| 6,299,400 B1 | | 10/2001 | Tebo | 411/459 |
| D450,568 S | | 11/2001 | Sachs | D8/382 |
| 6,311,443 B1 | | 11/2001 | Allazetta | 52/392 |
| 6,314,699 B1 | | 11/2001 | West | 52/489.1 |
| 6,367,224 B1 | | 4/2002 | Leek | 52/704 |

(Continued)

FOREIGN PATENT DOCUMENTS

EP  1 635 008 A2  3/2006

(Continued)

OTHER PUBLICATIONS

British Search Report under Section 17 dated Nov. 22, 2006.

(Continued)

*Primary Examiner*—Richard E Chilcot, Jr.
*Assistant Examiner*—Mark R Wendell
(74) *Attorney, Agent, or Firm*—Alix, Yale & Ristas, LLP

(57) ABSTRACT

A fastener system including two interengaging members for securing boards to supporting members.

7 Claims, 12 Drawing Sheets

U.S. PATENT DOCUMENTS

| | | | |
|---|---|---|---|
| 6,402,415 B1 | 6/2002 | Eberle, III | 403/231 |
| 6,416,269 B1 * | 7/2002 | Martel et al. | 411/461 |
| D462,601 S | 9/2002 | Chaney | D8/354 |
| 6,446,409 B1 * | 9/2002 | Emerson | 52/712 |
| 6,481,613 B1 | 11/2002 | Tebo | 227/147 |
| 6,490,838 B2 | 12/2002 | Summerford | 52/650.3 |
| D470,039 S | 2/2003 | Pelc | D8/382 |
| 7,052,200 B2 * | 5/2006 | Harris | 403/231 |
| 2003/0019174 A1 * | 1/2003 | Bolduc | 52/290 |
| 2004/0020153 A1 * | 2/2004 | Huang | 52/582.1 |
| 2004/0206038 A1 * | 10/2004 | Stanchfield | 52/582.1 |
| 2004/0237463 A1 * | 12/2004 | Reif et al. | 52/782.1 |
| 2005/0252154 A1 * | 11/2005 | Martel et al. | 52/712 |

FOREIGN PATENT DOCUMENTS

| | | |
|---|---|---|
| FR | 1.120.223 | 7/1956 |
| WO | WO 02/066756 A1 | 8/2002 |

OTHER PUBLICATIONS

Green, C.; "Synthetic Decking Takes Off"; *Fine Homebuilding*; Jun./Jul. 2005; 44-49.

* cited by examiner

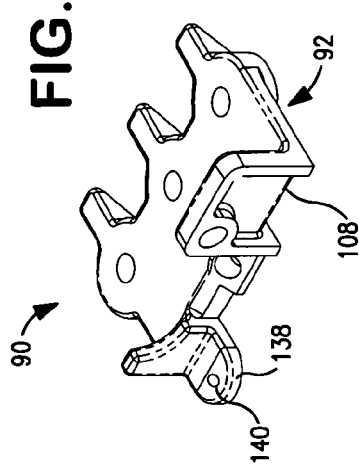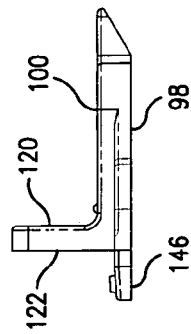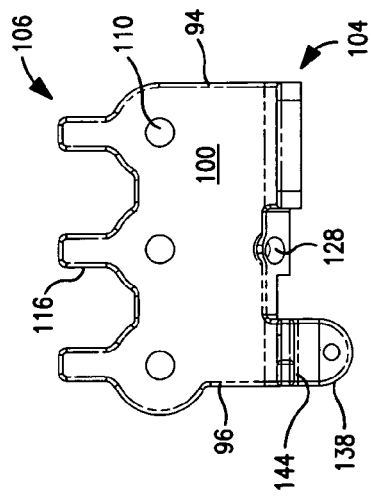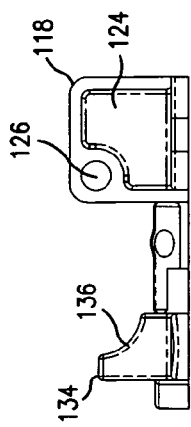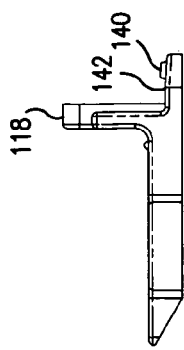

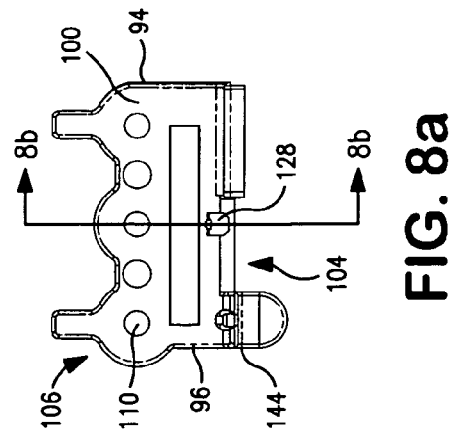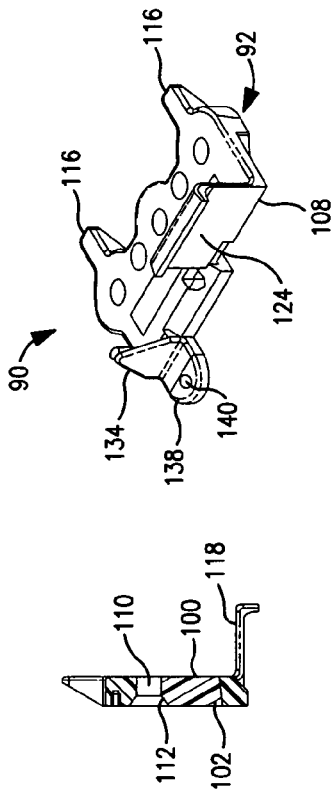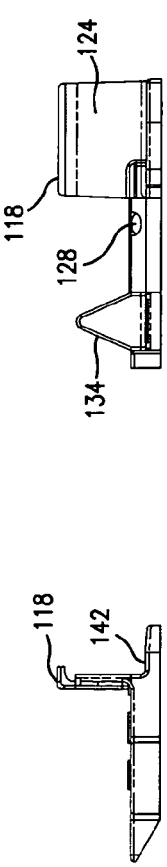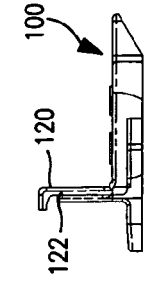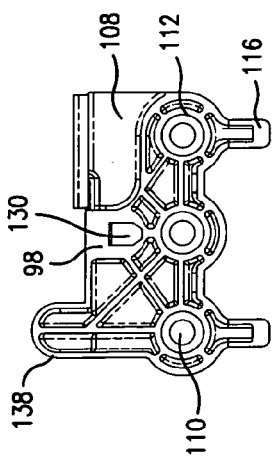

HIDDEN DECK FASTENER SYSTEM

This application claims the benefit of U.S. Provisional Patent Application No. 60/709,635, filed Aug. 19, 2005, the contents of which are incorporated herein by reference in their entirety.

FIELD OF THE INVENTION

The present disclosure relates generally to a fastener system for securing boards to supporting members. The present disclosure is particularly advantageous for use as a hidden deck fastener system for securing cover boards to supporting members in a deck system.

BACKGROUND OF THE INVENTION

Fasteners such as nails or screws for securing boards to supporting members such as joists are well known. More recently, so called "hidden decking" systems which fasten covering boards to joists without having a fastener penetrate the visible, top surface of the covering board have come into demand. Many of these hidden decking systems require extensive preparation of the decking system components such as pre-drilling tracks on the joists, pre-drilling slots or holes in cover boards for fasteners, or gluing of the cover boards to the joists. Some hidden decking systems must be substantially installed from below the deck, a time consuming, expensive and potentially dangerous procedure.

SUMMARY OF THE INVENTION

The fastener system in any embodiment may be used to fasten a board to a supporting member. In one embodiment the fastener system comprises a shoulder member and a tab member. The shoulder member comprises a base having opposing lower and upper faces and one or more apertures connecting the faces. The base defines at least one tab cavity therein. One or more shoulders project generally perpendicularly from an end of the base. The shoulder defines a stop cavity therein. One or more fingers may optionally project from an end of the base.

The tab member comprises a base having opposing lower and upper faces and one or more apertures joining those faces. One or more tabs project from an end of the base. One or more stops project generally perpendicularly from an end of the base. In one advantageous variation the stops are somewhat triangularly shaped with one side of the stop being relieved. One or more fingers may optionally project from an end of the base. The shoulder member is typically interengaged with a tab member in use.

In another embodiment the fastener system comprises a clip having a base. The clip base comprises opposing lower and upper faces and defines one or more apertures connecting the faces and defines a tab cavity therein at an end of the base. A shoulder projects generally perpendicularly from an end of the base. The shoulder defines a stop cavity therein. A tab projects from an end of the base. A stop projects generally perpendicularly from an end of the base. In one advantageous variation the stop is somewhat triangularly shaped with one side of the stop being relieved. One or more fingers may optionally project from an end of the base. One clip is typically interengaged with another similar clip in use.

In another embodiment the fastener system provides a method of fastening boards to a supporting member. For example, the system can be used to fasten cover boards to a deck frame. Briefly, in this example one member or clip is fastened to one longitudinal edge of a cover board and the complementary member or another clip is fastened to the other longitudinal edge of that cover board. The cover board is placed over a support, for example a joist, so that the members or clips are disposed between the support and the cover board. One member or clip is fastened to the support and the opposing member or clip is not fastened to the support. Additional members or clips are fastened to a second cover board in similar fashion. The second cover board is placed over the support and adjacent the first cover board so that the members or clips are between the support and the cover board. The members or clip on the second cover board are interengaged with the complementary members or clips on the first cover board that were previously fastened to the support. The interengaged members or clips on the second cover board are not fastened to the support but is held adjacent the support by interengagement with the first cover board members or clips which are fastened to the support. The non-interengaged member or clip on the second cover board is fastened to the support to bias the second cover board toward the first cover board and maintain interengagement of the cover board members or clips. Naturally, additional members or clips would be fastened to the first and second cover boards at other joist locations. This procedure would typically be repeated to fasten the remaining cover boards.

Various fastener system embodiments can provide a number of benefits over existing systems. Only one edge of a board is fastened to the support while the other edge is maintained adjacent the support by interengagement of that board's member or clip with an adjacent board's member or clip. Thus, one edge of the board has some horizontal movement to accommodate cover board movement during installation and shrinkage but very limited vertical movement. The fastener system is partially covered by the cover boards and not readily apparent to an observer standing on a finished deck. In some embodiments the fastener system can advantageously be clear, tinted, colored, translucent or opaque as desired. The fastener system provides a consistent space between the longitudinal edges of two adjacent cover boards and between the cover board lower surface and the support members to allow for water drainage. The predefined fastener apertures consistently locate the fastener to save time and prevent misapplication of the fastener. Workers can readily position and fasten the cover boards and all or most of the fastener system from above the deck frame.

In general, the embodiments of the invention may be alternately formulated to comprise, consist of, or consist essentially of, any appropriate components herein disclosed. The embodiments of the invention may additionally, or alternatively, be formulated so as to be devoid, or substantially free, of any components, materials or species used in the prior art compositions or that are otherwise not necessary to the achievement of the function and/or objectives of the present invention.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

A better understanding of the invention will be obtained from the following detailed description of the presently preferred, albeit illustrative, embodiments of the invention.

BRIEF DESCRIPTION OF THE DRAWINGS:

Referring now to the drawings:

FIG. 7a is a top plan view of an embodiment of a fastener system clip.

FIG. 7b is a perspective view of the clip of FIG. 7a.

FIG. 7c is a side view of the clip of FIG. 7a.

FIG. 7d is a view of the clip of FIG. 7a from the engagement end.

FIG. 7e is a side view of the clip of FIG. 7a.

FIG. 7f is a plan view of the lower face of the clip of FIG. 7a.

FIG. 8a is a top plan view of an embodiment of a fastener system clip.

FIG. 8b is a cross sectional view of the clip of FIG. 8a through line AA.

FIG. 8c is a perspective view of the clip of FIG. 8a.

FIG. 8d is a side view of the clip of FIG. 8a.

FIG. 8e is a view of the clip of FIG. 8a from the engagement end.

FIG. 8f is a side view of the clip of FIG. 8a.

FIG. 8g is a plan view of the lower face of the clip of FIG. 8a.

DETAILED DESCRIPTION

Figure 1:
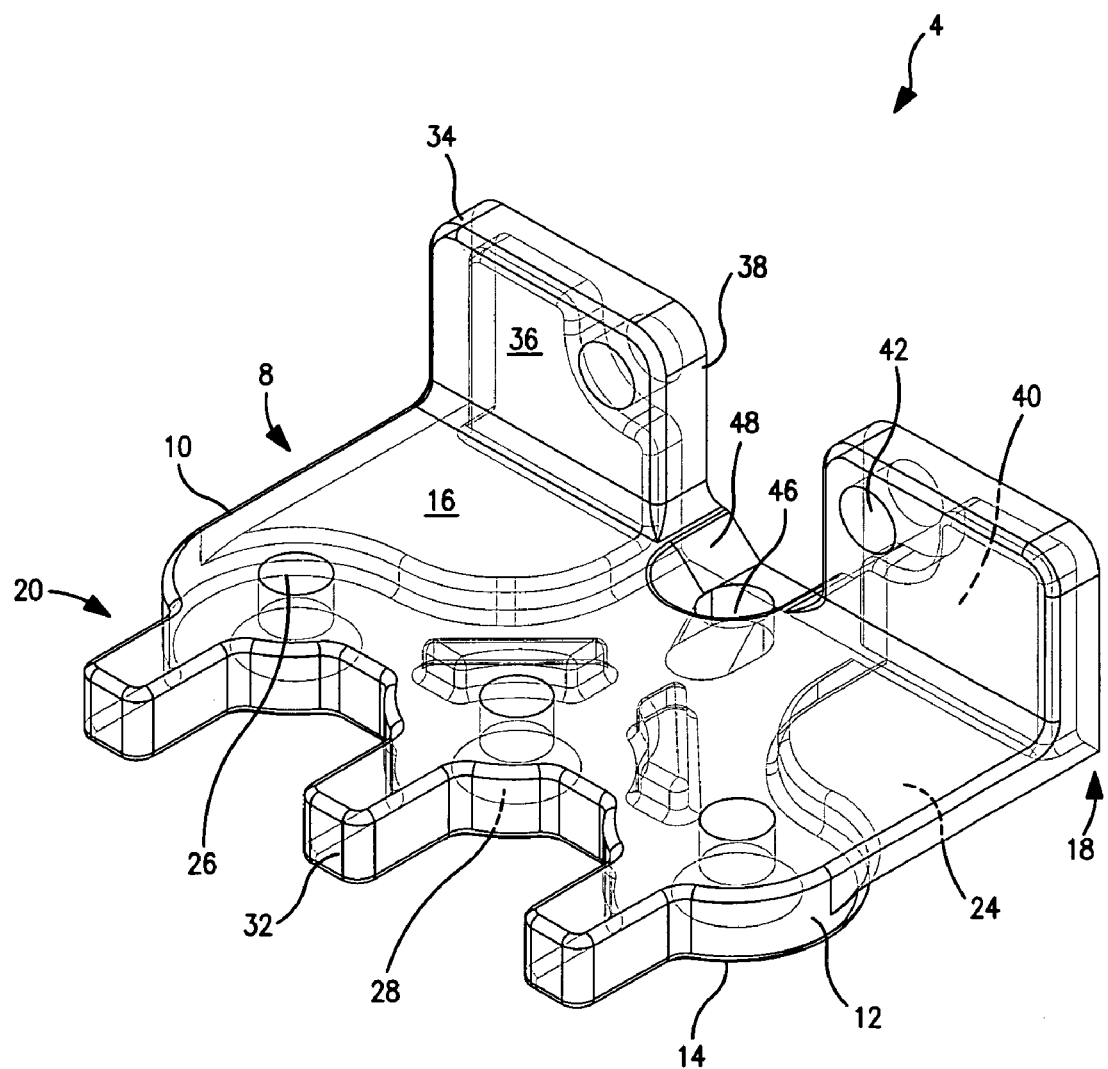
FIG. 1 is a schematic, perspective view of one embodiment of a fastener system shoulder member.
Figure 2:
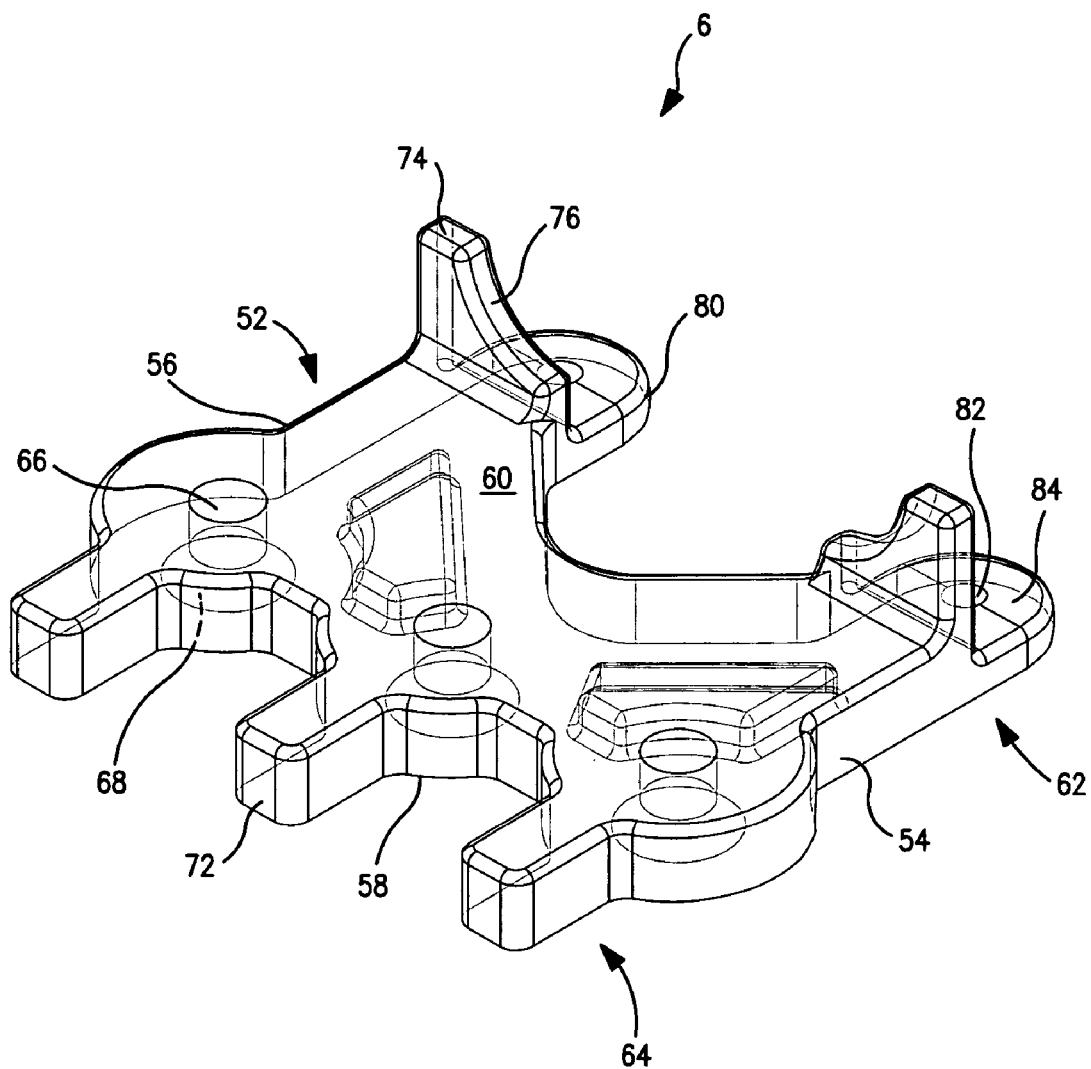
FIG. 2 is a schematic, perspective view of one embodiment of a fastener system tab member.
Figure 10:
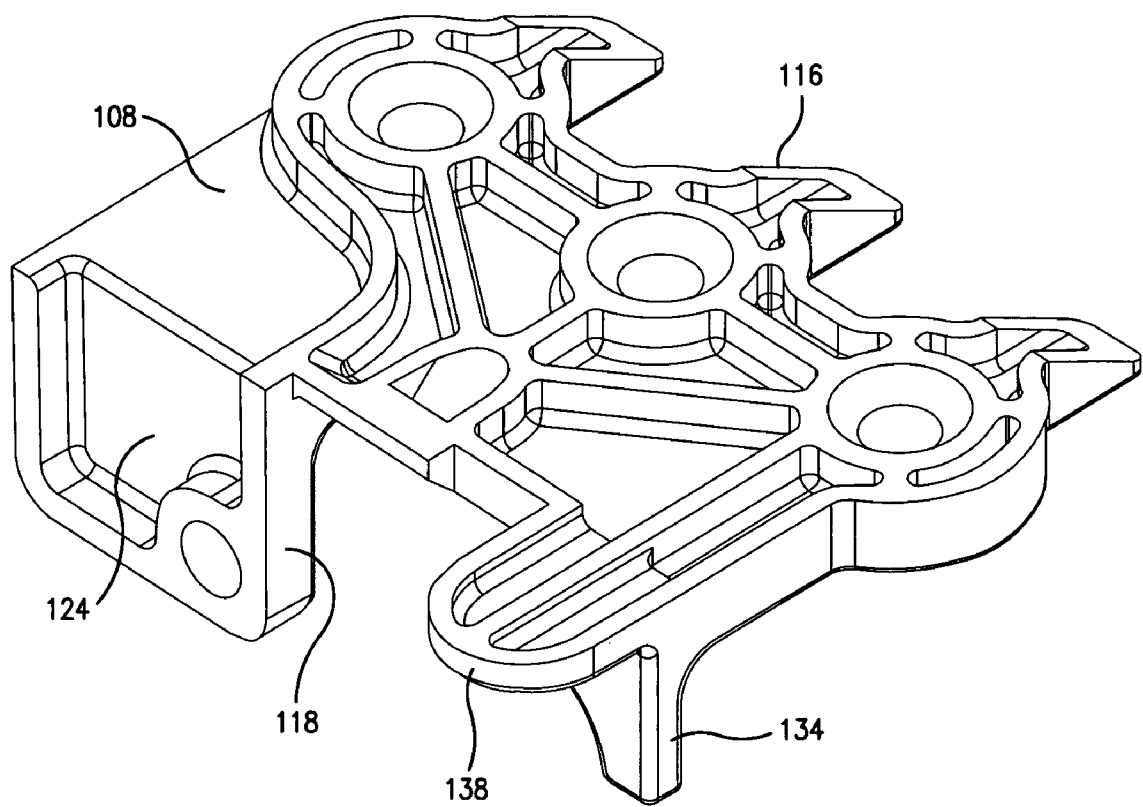
FIG. 10 is a schematic, perspective view of the relieved lower face of one embodiment of a clip.

With reference to FIGS. 1 and 2, in one embodiment the fastener system 2 includes a shoulder member 4 and a tab member 6. As shown best in FIG. 1, the shoulder member 4 comprises a base 8 with opposing sides 10, 12, a lower face 14, an upper face 16 opposing the lower face, an engagement end 18 and a finger end 20 opposing the engagement end 18. Either or both of the faces may have material removed, for example as exemplified in FIG. 8g and 10. The base 8 defines one or more tab cavities (each 24) therein. Advantageously, the tab cavity 24 is accessible from the lower face 14 and from the engagement end 18. One or more apertures (each 26) connect the opposing faces 14, 16. The aperture 26 advantageously includes a countersunk portion 28 defined within the lower face 14.

The finger end 20 advantageously comprises one or more fingers (each 32) projecting outwardly from the finger end 20 of the base 8. The finger 32 may project in generally parallel relationship with the base 8.

The engagement end 18 comprises one or more shoulders (each 34) projecting in generally perpendicular relation to the base 8. Each shoulder 34 has opposing faces 36, 38. Advantageously, at least one shoulder 34 comprises a cavity face 38 disposed away from the finger end 20 and defining a stop cavity 40. Advantageously, at least one shoulder 34 defines an aperture 42 connecting the opposing shoulder faces 36, 38.

The base 8 defines an inclined aperture 46 connecting the lower 14 and upper 16 faces. The inclined aperture 46 is angled from the engagement end 18 of the upper face 16 toward the finger end 20 of the lower face 14. The inclined aperture 46 advantageously includes a countersunk portion 48 defined in the base upper face 16. The inclined aperture 48 is advantageously provided in a generally central position between the base sides 10, 12. In one advantageous variation the shoulder member 4 is about 2½ inches wide between sides 10, 12; about 2 inches long from end of the finger 32 to opposing engagement end of the base 18 and about ⅞ inches high between the lower face 14 and top of the shoulder 34.

As shown best in FIG. 2, the tab member 6 comprises a base 52 with opposing sides 54, 56, a lower face 58, an upper face 60 opposing the lower face 58, an engagement end 62 and a finger end 64 opposing the engagement end 62. Either or both of the faces 58, 60 may have material removed. One or more apertures (each 66) connect the opposing faces 58, 60. The aperture 66 advantageously includes a countersunk portion 68 defined within the lower face 58.

The finger end 64 advantageously comprises one or more fingers (each 72) projecting outwardly from the finger end 64 of the base 52. Advantageously, the finger 72 will project in generally parallel relationship with the base 52.

The engagement end 62 comprises one or more stops (each 74) projecting in generally perpendicular relation to the base 52. The stop 74 is advantageously somewhat triangularly shaped with a somewhat concave surface 76 in one side. One or more tabs (each 80) project from the engagement end 62 in generally parallel relationship with the base 52. One or more of the tabs 80 may include a raised portion 82 on an upper tab surface 84. In one advantageous variation the tab member 6 is about 2½ inches wide between sides 54, 56; about 2¼ inches long from end of the finger 72 to opposing end of the tab 80 and about ⅝ inches high between the lower face 58 and top of the stop 74.

The shoulder member 4 and tab member 6 are designed to allow interengagement of these members during use. As used herein interengagement means the tab member tab 80 is disposable within the shoulder member tab cavity 24 while the tab member stop 74 is simultaneously disposable within the shoulder member stop cavity 40. The tab cavity 24, tab 80, stop cavity 40 and stop 74 are advantageously designed so that there is some horizontal movement between interengaged members 4, 6. It should be noted that the clips, and thereby boards fastened thereto, are prevented from vertical movement by the positioning of the tabs in the tab cavities. Advantageously, the tab member 6 has about ¼ inch of side to side movement when interengaged to the shoulder member 4. The shoulder member stop cavity 40 is advantageously sized and shaped to allow for increased side to side movement of the stop 74 therein. Advantageously, the shoulder member lower face 14 and the tab member lower face 58 will be generally coplanar when the members 4, 6 are interengaged. Also advantageously, the stop 74 will be disposed entirely within the stop cavity 40 when the members 4, 6 are interengaged.

With reference to FIGS. 7a to 7f and 8a to 8g, in other embodiments the fastener system 2 comprises a single clip 90 having features of both the above shoulder member 4 and a tab member 6. The clip 90 comprises a base 92 with opposing sides 94, 96, a lower face 98, an upper face 100 opposing the lower face 98, an engagement end 104 and a finger end 106 opposing the engagement end 104. Either or both of the faces 98, 100 may have material removed, for example as exemplified in FIGS. 8g and 10. The base 92 defines a tab cavity 108 therein. Advantageously, the tab cavity 108 is accessible from the lower face 98 and from the engagement end 104. One or more apertures (each 110) connect the opposing faces 98, 100. The aperture 110 advantageously includes a countersunk portion 112 defined within the lower face 100.

The finger end 106 advantageously comprises one or more fingers (each 116) projecting outwardly from the finger end 106 of the base 92.

The engagement end 104 comprises a shoulder 118 projecting in generally perpendicular relation to the base 92. The shoulder 118 has opposing faces 120, 122. Advantageously, the shoulder face 122 disposed away from the finger end 106 defines a stop cavity 124. The shoulder 118 may advantageously define an aperture 126 connecting the opposing shoulder faces 120, 122.

The base 92 defines an inclined aperture 128 connecting the upper 100 and lower 98 faces. The inclined aperture 128 is angled generally from the engagement end 104 of the upper face 100 toward the finger end 106 of the lower face 98. The opening 130 of the inclined aperture 128 defined in the lower face 98 can be enlarged. The inclined aperture 128 is advantageously provided in a generally central position between the base sides 94, 96.

The engagement end 104 comprises a stop 134 projecting in generally perpendicular relation to the base 92. The stop 134 is advantageously somewhat triangularly shaped. The stop may comprise a somewhat concave surface 136. A tab 138 projects from the engagement end 104 in generally parallel relationship with the faces 98, 100. The tab 138 may include a raised portion 140 on an upper tab surface 142. Advantageously a score or notch 144 is disposed transversely across the tab 138. In one advantageous variation the clip 90 is about 2½ inches wide between sides 94, 96; about 2¼ inches long from end of the finger 116 to opposing end of the tab 138 and about ⅞ inches high between the lower face 108 and top of the shoulder 118.

The use of letter suffixes denotes an element present on a clip having that suffix. The clip 90a is designed to allow interengagement with another similar clip 90b during use. The tab 138a of a first clip 90a is disposable within the tab cavity 108b of a second clip 90b while the tab 138b of the second clip 90b is simultaneously disposable within the tab cavity 108a of the first clip 90a. The stop 134a of the first clip 90a is disposable within the stop cavity 124b of the second clip 90b while the stop 134b of the second clip 90b is simultaneously disposable within the stop cavity 124a of the first clip 90a. The stop concave surface 136a, 136b allows for increased side to side movement of the stop 134a, 134b within the complementary stop cavity 124b, 124a. The tab cavity 108a, 108b, tab 138a, 138b, stop cavity 124a, 124b and stop 134a, 134b are advantageously designed so that there is some horizontal movement between interengaged clips 90a, 90b. It should be noted that the clips, and thereby boards fastened thereto, are prevented from vertical movement by the positioning of the tab in the tab cavity. Advantageously, the interengaged clips 90a, 90b have about ¼ inch of side to side movement. Advantageously, the interengaged clips lower faces 98a, 98b will be generally coplanar. Also advantageously, the stops 134a, 134b will be disposed entirely within the stop cavities 124b, 124a when the clips 90a, 90b are interengaged.

The fastener system 2 in any embodiment can be manufactured from any number of materials having suitable strength characteristics, for example metals, composites and polymers. Advantageously, the fastener system 2 is manufactured from molded polycarbonate. This material provides strong members that are corrosion resistant and which are clear, tinted, colored, translucent or opaque as desired and therefore desirably less visible than metal or colored components in the finished deck system. Advantageously the material is clear or tinted but still slightly transparent to match the cover board color.

For simplicity the fastener system will be described in simplified fashion with relation to a deck system. It should be noted that FIGS. 3, 4 and 5 exemplify various aspects of the fastener system in use but do not illustrate a complete deck system. It should also be noted that the fastener system is useful in other environments and using other combinations and assembly sequences and all such uses are part of this invention. A frame 150 for use with a plurality of cover boards (each 152) can comprise a frame or support member 154, for example, rim joists or ledgers and joists 156 and is prepared in conventional manner.

Figure 3:
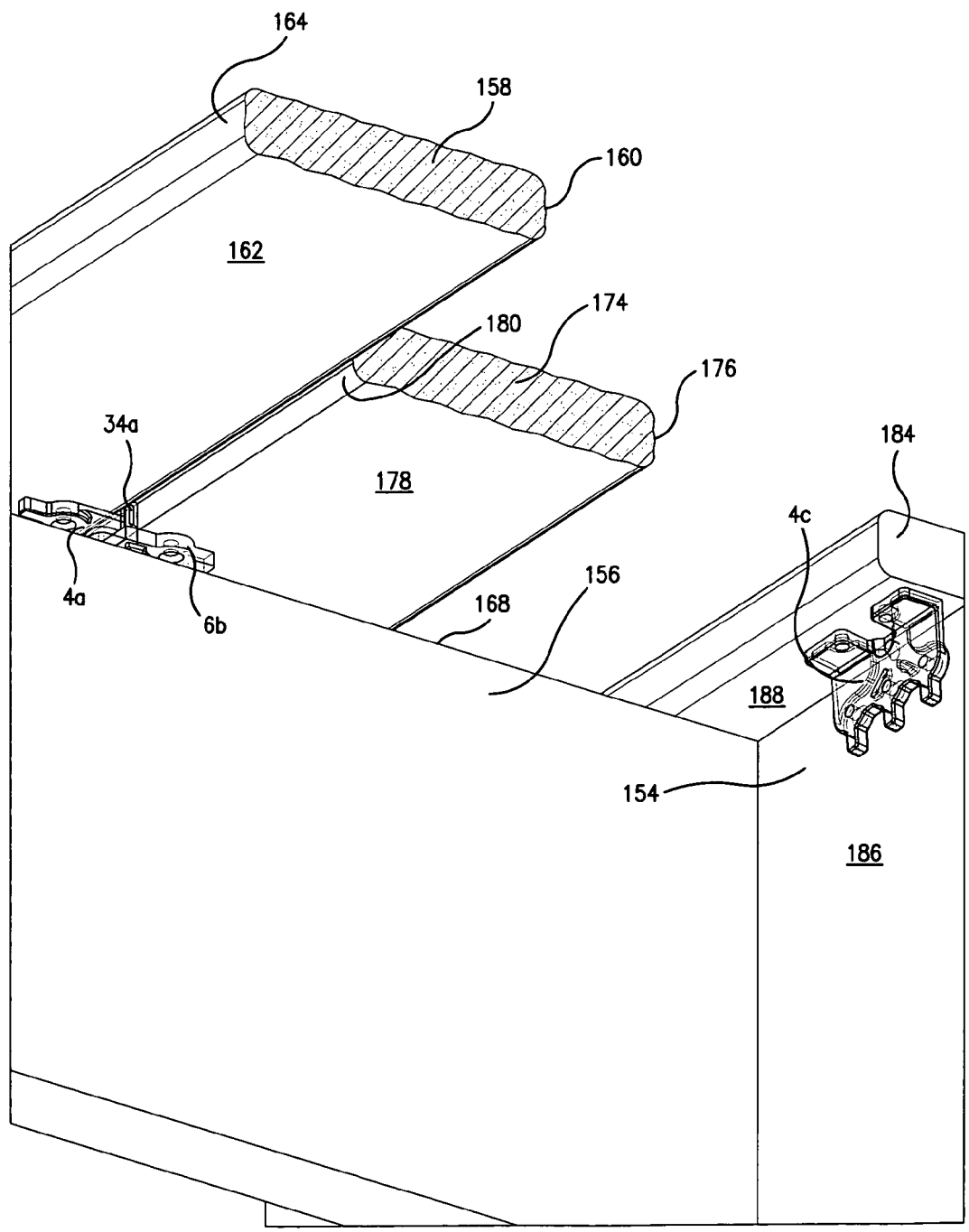
FIG. 3 is a perspective view of one embodiment of a shoulder member positioned adjacent a rim joist and cover board and another interengaged shoulder member-tab member pair disposed between a joist and two adjacent, broken away, cover boards.
Figure 4:
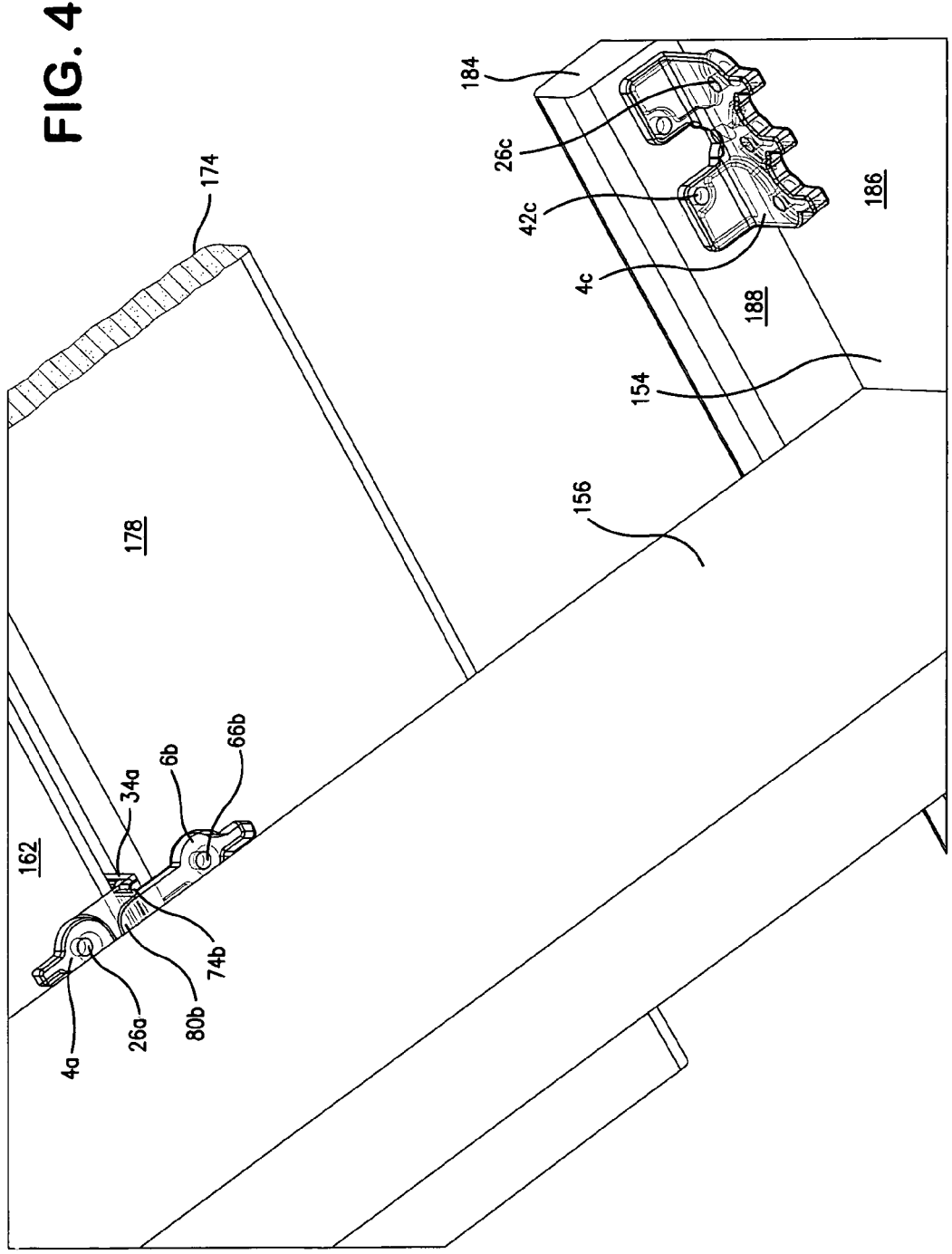
FIG. 4 is a view similar to FIG. 3 from a different perspective.
Figure 5:
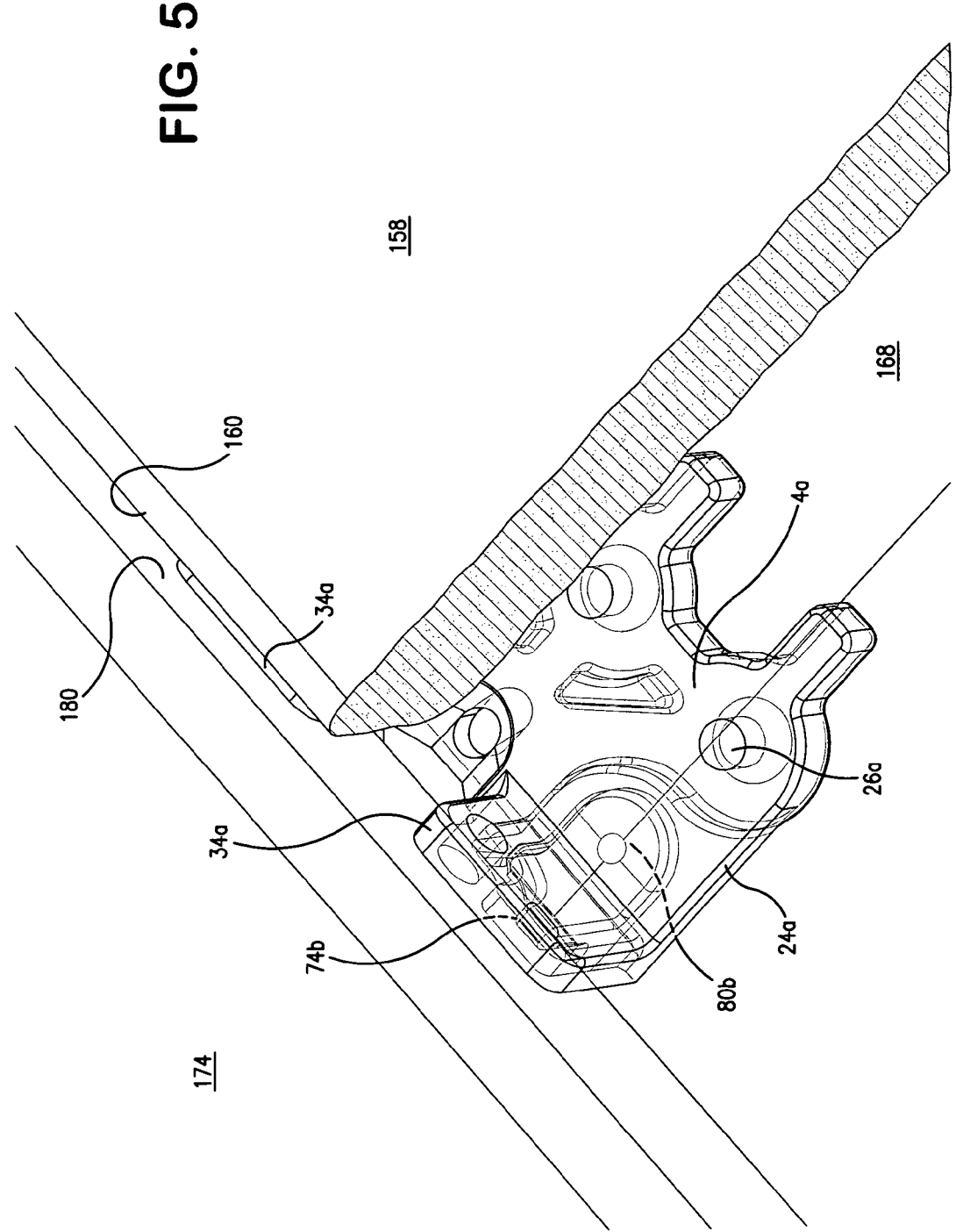
FIG. 5 is a schematic view showing portions of an interengaged shoulder member-tab member pair disposed between a joist and two adjacent cover boards, one cover board being broken away.
Figure 6:
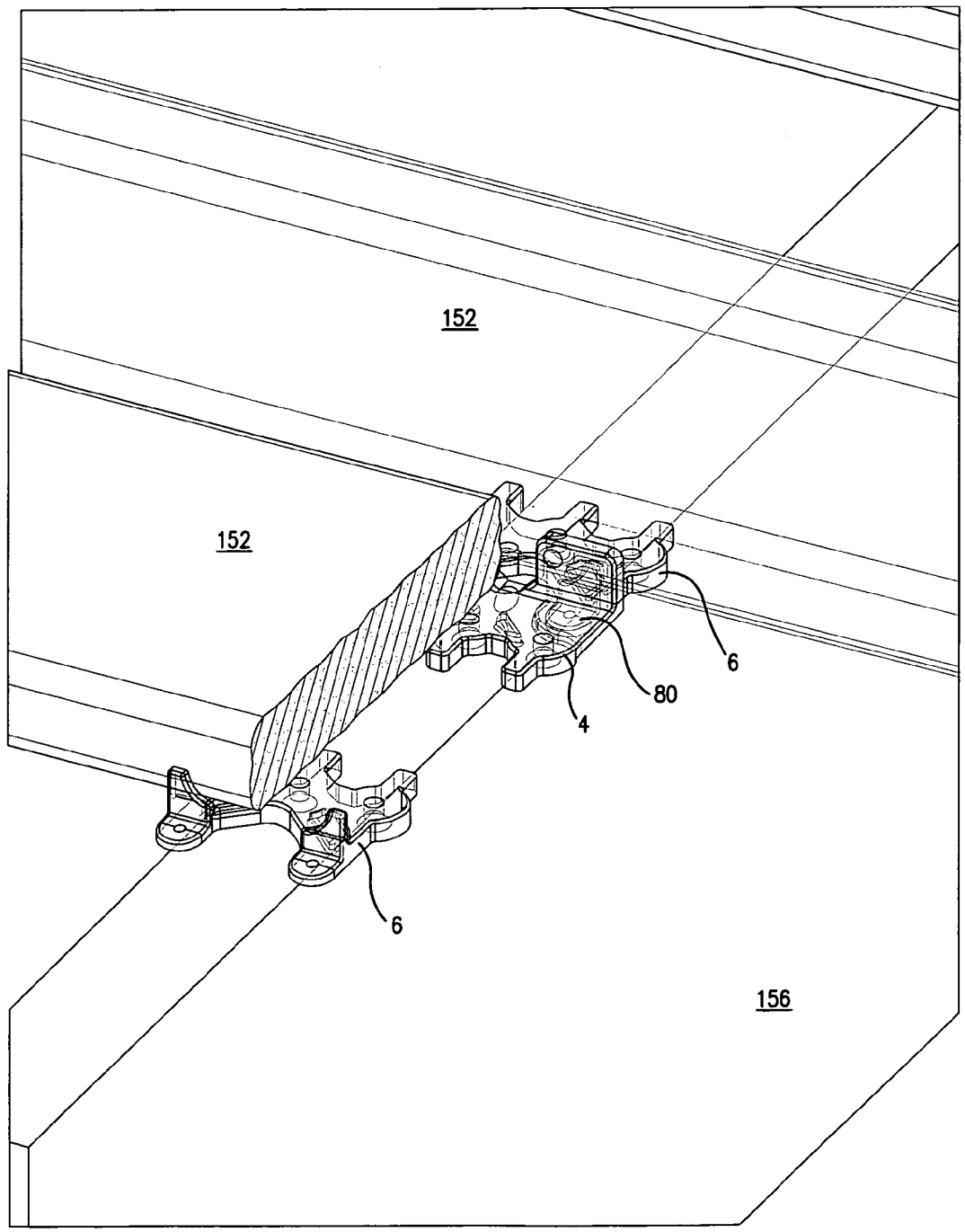
FIG. 6 is a schematic view showing portions of an interengaged shoulder member-tab member pair disposed between a joist and one cover board partially in phantom and an adjacent partially broken away cover board, and another tab member disposed between the joist and an opposing edge of one of the cover boards.

In the embodiment disclosed in FIGS. 1 and 2 and with general reference to FIGS. 3, 4 and 5, a cover board 158 is positioned over the joists and the position of each joist is noted. A first shoulder member 4a is positioned so that the shoulders 34a are adjacent one cover board longitudinal edge 160 and the upper face 16a is adjacent the cover board lower surface 162. A first tab member 6a (not shown) is positioned so that the stops 74a are adjacent the other cover board longitudinal edge 164 and the upper face 60a is adjacent the cover board lower surface 162. The centerlines for the shoulder member 4a and tab member 6a are typically aligned with the center of the previously noted joist position. Fasteners (each 166, not shown) are disposed through one or more of the shoulder (each 26a) and tab member (each 66a) apertures and into the cover board lower surface 162 to fasten the shoulder 4a and tab 6a members to the cover board 158. This sequence is repeated as desired to fasten additional shoulder and tab members to cover board 158 at other noted joist positions. The cover board 158 is flipped so that the lower surface 162 is adjacent the joist top surface 168.

A second cover board 174 is positioned over the joists and the position of each joist is noted. A second shoulder member 4b (not shown) is positioned so that the shoulders 34b are adjacent one second cover board longitudinal edge 176 and the upper face 16b is adjacent the cover board lower surface 178. A second tab member 6b is positioned so that the stops 74b are adjacent the opposing second cover board longitudinal edge 180 and the upper face 60b is adjacent the cover board lower surface 178. The centerlines for the shoulder member 4b and tab member 6b are typically aligned with the center of the previously noted joist position. Fasteners (166, not shown) are disposed through one or more shoulder 26b and tab member 66b apertures and into the second cover board lower surface 178 to fasten the shoulder 4b and tab 6b members to the second cover board 174. This sequence is repeated as desired to fasten additional shoulder and tab members to cover board 174 at other noted joist positions.

The second cover board 174 is flipped and positioned so that the longitudinal edge 180 with tab member 6b fastened thereto is adjacent the previous cover board 158 longitudinal edge 160 to which shoulder member 4a is fastened.

The second cover board tab member (6b, only partially shown) and the first cover board shoulder member (4a, only partially shown) are engaged so that the tabs 80b are disposed within the adjacent shoulder member tab cavities 24a and the stops 74b are disposed within the shoulder member stop cavities 40a.

A fastener (not shown) is disposed through the inclined aperture 46b of the shoulder member 4b fastened to the second cover board 174 and into the joist 156 to fasten the shoulder member 4b, and thereby the second cover board 174 to the frame. The fastener biases the second cover board shoulder member 4b, and thereby the second cover board 174, toward another cover board or other abutment (not shown). This bias also maintains engagement of the tabs 80b in the tab cavities 24a and the stops 74b in the stop cavities 40a. This process can be repeated as needed to fasten other deck cover boards to the frame.

The tab member 6b in this embodiment is not typically fastened to the joist, rather engagement of the tabs 80b in the tab cavities 24a and the stops 74b in the stop cavities 40a will maintain the second cover board 174 adjacent the joist. The shape of the tabs 80b, tab cavities 24a, stops 74b and stop cavities 40a allows some horizontal movement of the tab member 6b with respect to the shoulder member 4a to help in aligning the first 158 and second 174 cover boards and allow for cover board shrinkage and expansion, however vertical movement of tab member 6b and thereby cover board 174 is substantially limited.

Typically the outermost cover board in a deck system is positioned generally adjacent a support member such as a rim joist or ledger. The shoulder member fastened adjacent the longitudinal edge of this cover board is disposed between the cover board lower surface and the support member top surface as described above and will typically have fingers 32 pointing toward the rim joist or ledger. A fastener 166 is disposed through the shoulder member inclined aperture 46 and into the joist 156 to fasten the shoulder member 4, and thereby the cover board to the frame. The next cover board in the deck system will have a tab member interengaged to the outermost cover board shoulder member.

With reference again to FIGS. 3 and 4, if desired, a cover board 184 may additionally be fastened to a support member 154 such as a rim joist or ledger with a shoulder member 4c disposed so that the lower face 14 is adjacent a frame member surface 186 and the shoulder face 38 is adjacent the cover board lower surface. In this position the shoulder face 38 will be raised slightly over the support member 154 top surface. Fasteners (not shown) are disposed through one or more of the shoulder member apertures 42c into the cover board lower surface 188 and through one or more of the shoulder member base apertures 26c into the frame member surface 186 so that the shoulder member 4c fastens the cover board 184 to the support member 154. Additional shoulder members may be used at spaced locations along the longitudinal length of the cover board 184 in similar fashion to fasten the entirety of the cover board 184 to the support member 154.

A final cover board can be fastened to the frame by interengagement of shoulder and tab members and additionally fastened to the frame by a shoulder member as described above with reference to FIG. 4 and member 4c. In this variation the shoulder member lower face is adjacent the support member surface and the shoulder face is adjacent the final cover board lower surface. In this position the shoulder face will be raised slightly over the support member top surface. Fasteners (not shown) are disposed through one or more of the shoulder member apertures into the cover board lower surface and through one or more of the shoulder member base apertures into the frame member surface so that the shoulder member fastens the final cover board to the support member. Additional shoulder members may be used at spaced locations along the longitudinal length of the final cover board in similar fashion to fasten the entirety of the final cover board to the support member. Since the cover boards are in place access to the final cover board lower surface is limited and this final operation may need to be performed from the edge of the deck or from underneath the deck.

Figure 9:
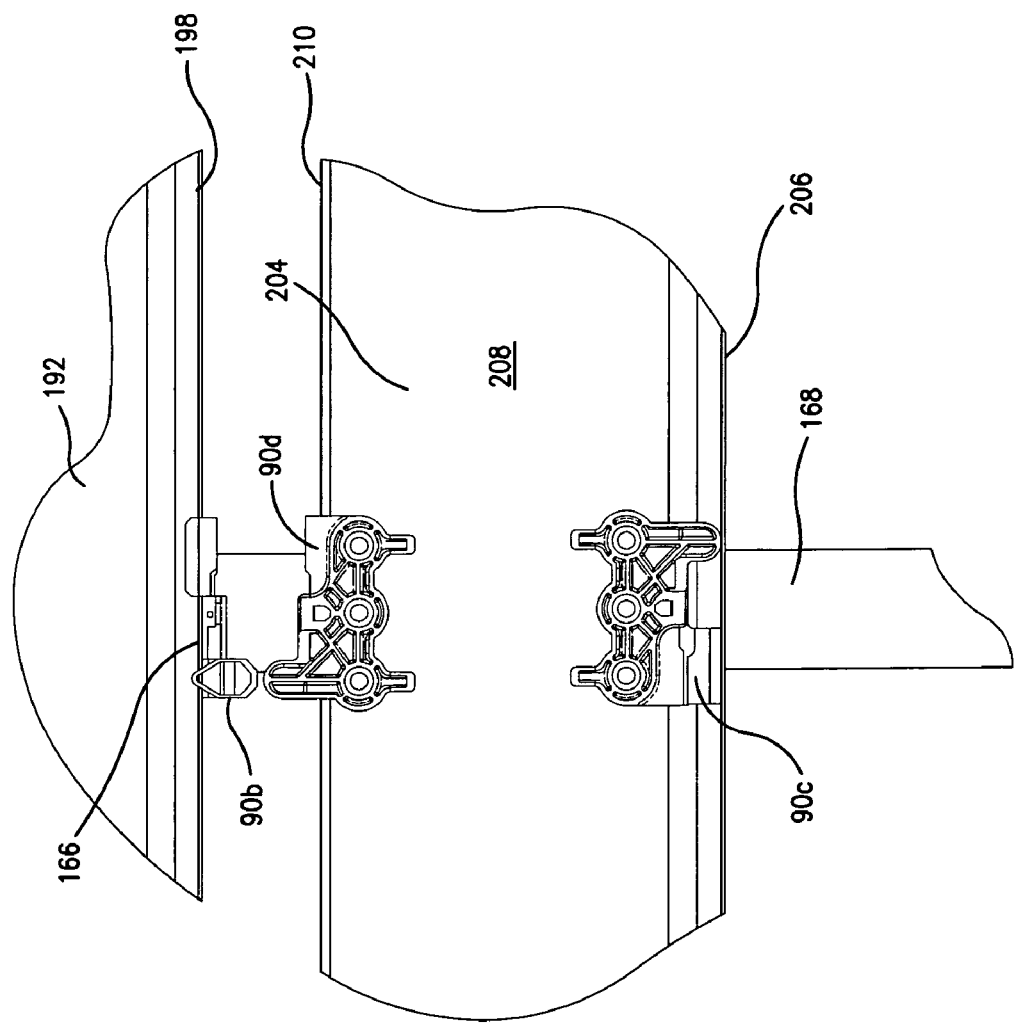
FIG. 9 is a schematic, top view of portions of covering boards and clips disposed over a joist.

In the embodiment disclosed in FIG. 7 and with reference to FIG. 9, a frame (150, not shown) can comprise frame members, for example, rim joists, ledgers and joists and is prepared in conventional manner. A cover board 192 is positioned over the joists (not shown for clarity) and the position of each joist is noted. A first clip (90a, not shown) is positioned so that the shoulder 118a and stop 134a are adjacent cover board longitudinal edge 194 and the upper face 100a is adjacent the cover board lower surface 196. A second clip 90b is positioned so that shoulder 118b and stop 134b are adjacent the other cover board longitudinal edge 198 and the upper face 100b is adjacent the cover board lower surface 196. The centerlines for the first 90a and second 90b clips are typically aligned with the center of the previously noted joist position. Fasteners (not shown) are disposed through one or more of the clip base apertures 110a, 110b and into the cover board lower surface 196 to fasten the clips 90a, 90b to the cover board 192. This sequence is repeated as desired for the other noted joist positions. The cover board 192 is flipped so that the clip lower faces 98a, 98b are adjacent the joist top surface 168. In this position the clips 90a, 90b are disposed between the first cover board lower surface 196 and the joist top surface 168. A fastener 166 is disposed through a clip inclined aperture 128b and into the joist to fasten the clip 90b, and thereby the first cover board 192 to the frame. Additional clips may be prepared and used at spaced locations along the longitudinal length of the cover board 192 in similar fashion to fasten the first cover board 192 to other joists. The fastener 166 biases the clip 90b, and thereby the cover board 192, in the opposing direction.

A second cover board 204 is positioned over the joists and the position of each joist is noted. A third clip 90c is positioned so that the stop 134c and shoulder 118c are adjacent one cover board longitudinal edge 206 and the upper face 100c is adjacent the cover board lower surface 208. A fourth clip 90d is positioned so that the stop 134d and shoulder 118d are adjacent the opposing longitudinal edge 210 of cover board 204 and the upper face 100d is adjacent the cover board lower surface 208. The centerlines for the third 90c and fourth 90d clips are typically aligned with the center of the previously noted joist position. Fasteners (not shown) are disposed through one or more of the third 110c and fourth 110d clips base apertures and into the second cover board lower surface 208 to fasten the third 90c and fourth 90d clips to the second cover board 204. This sequence is repeated as desired for the other noted joist positions.

The second cover board 204 is flipped and positioned so that one longitudinal edge 206 with clip 90c fastened thereto is adjacent the first cover board longitudinal edge 198 with clip 90b fastened thereto. In this position the clips 90c, 90d are disposed between the second cover board lower surface 208 and the joist top surface 168. The second cover board 204 is positioned so that clip 90c is interengaged with the first cover board clip 90b and tabs 138b, 138c are disposed within the tab cavities 108c, 108b respectively and the stops 134b, 134c are disposed within the stop cavities 124c, 124b respectively. The second cover board clip 90c is not fastened to the joist, although the disposition of the tabs 138, tab cavities 108, stops 134 and stop cavities 124 will maintain the second cover board 204 adjacent the joist. The shape of the tabs 138, tab cavities 108, stops 134 and stop cavities 124 allows some horizontal movement of the interengaged clips 90b, 90c to help in aligning the first 192 and second 204 cover boards and allow for cover board shrinkage and expansion, however vertical movement of clip 90c and thereby cover board 204 is substantially limited.

A fastener (not shown) is disposed through the second cover board clip inclined aperture 128d (not shown) and into the joist to fasten the clip 90d, and thereby the second cover board 204 to the frame. The fastener biases the second cover board clip 90d, and thereby the second cover board 204, toward the first cover board 192. This bias also maintains interengagement of clips 90b, 90c and disposition of the tabs 138 in the tab cavities 108 and the stops 134 in the stop cavities 124. This process can be repeated as desired to fasten other covers boards to the frame.

If desired, a cover board may additionally be fastened to the frame with a clip 90 (not shown). The clip 90 is prepared by removing the tab 138. Tab removal can be done with a cutting tool or by applying pressure to snap the tab 138 at the score 144. The clip 90 is disposed in a manner similar to that exemplified in FIG. 4 so that the lower face 98 is adjacent the frame member interior surface and the shoulder face 122 is adjacent the cover board lower surface. In this position the shoulder 118 will be raised slightly over the support member. Fasteners (not shown) are disposed through one or more of the clip apertures 110 and shoulder apertures 126 so that the clip 90 fastens the cover board to the support member. Additional clips may be prepared and used at spaced locations along the longitudinal length of the cover board in similar fashion to fasten the entirety of the first cover board to the frame member.

In the fastener system embodiment exemplified in FIGS. 8a to 8g, the clip 90 can be flipped 180 degrees from its normally installed orientation and disposed on the top edge of the rim joist or ledger so that upper face 100 is in contact with the top of the rim joist or ledger and shoulder face 120 is in contact with the frame member surface 186. One or more fasteners (each 166) are disposed through the countersunk holes 110 so that the clip 90 is fastened to the rim joist or ledger. A cover board is placed over surface 102 of the clip. The cover board will be at a desirable height, typically about ¼ inch, over the top of the rim joist or ledger due to the thickness of the base 92. A fastener 166 is disposed through the inclined aperture 128 up into the bottom of the cover board. In a variation an additional aperture (not shown) may be molded into the tab 138. A fastener may be disposed through the tab aperture into the cover board lower surface.

The final cover board is fastened to the frame by a clip, with tab removed, disposed so that the lower face is adjacent the rim joist or ledger interior surface and the shoulder face is adjacent the final cover board lower surface. In this position the shoulder will be raised slightly over the rim joist top. Fasteners (not shown) are disposed through the clip apertures. Additional clips may be used at spaced locations along the longitudinal length of the final cover board in similar fashion to fasten the entirety of this cover board to the rim joist or ledger. Since the cover boards are in place this operation may need to be performed from the edge of the deck or from underneath the deck.

Figure 11:
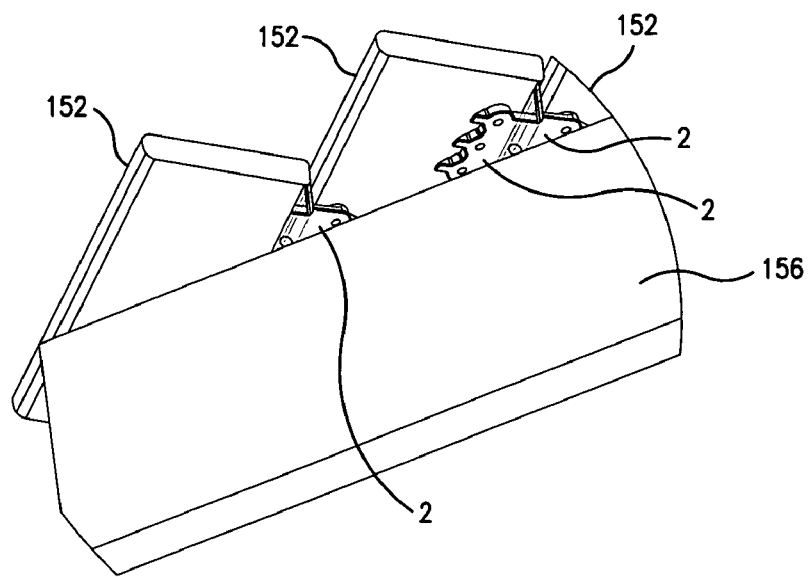
FIG. 11 is a perspective view from below a deck structure of a plurality of covering board portions fastened in a non-perpendicular arrangement over a portion of a joist.
Figure 12:
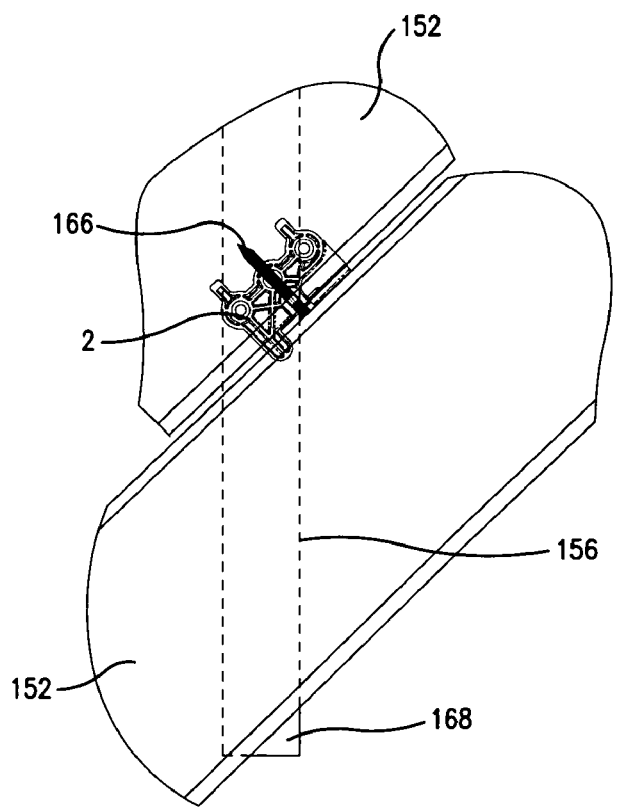
FIG. 12 is a top view of a plurality of covering board portions fastened to a portion of a joist in a non-perpendicular arrangement.

Typically covering boards are disposed so that they are generally perpendicular to joists. With reference to FIGS. 11 and 12, the fastener system 2 in any embodiment may also be used to fasten covering boards to a joist at angles other than ninety degrees.

Figure 13:
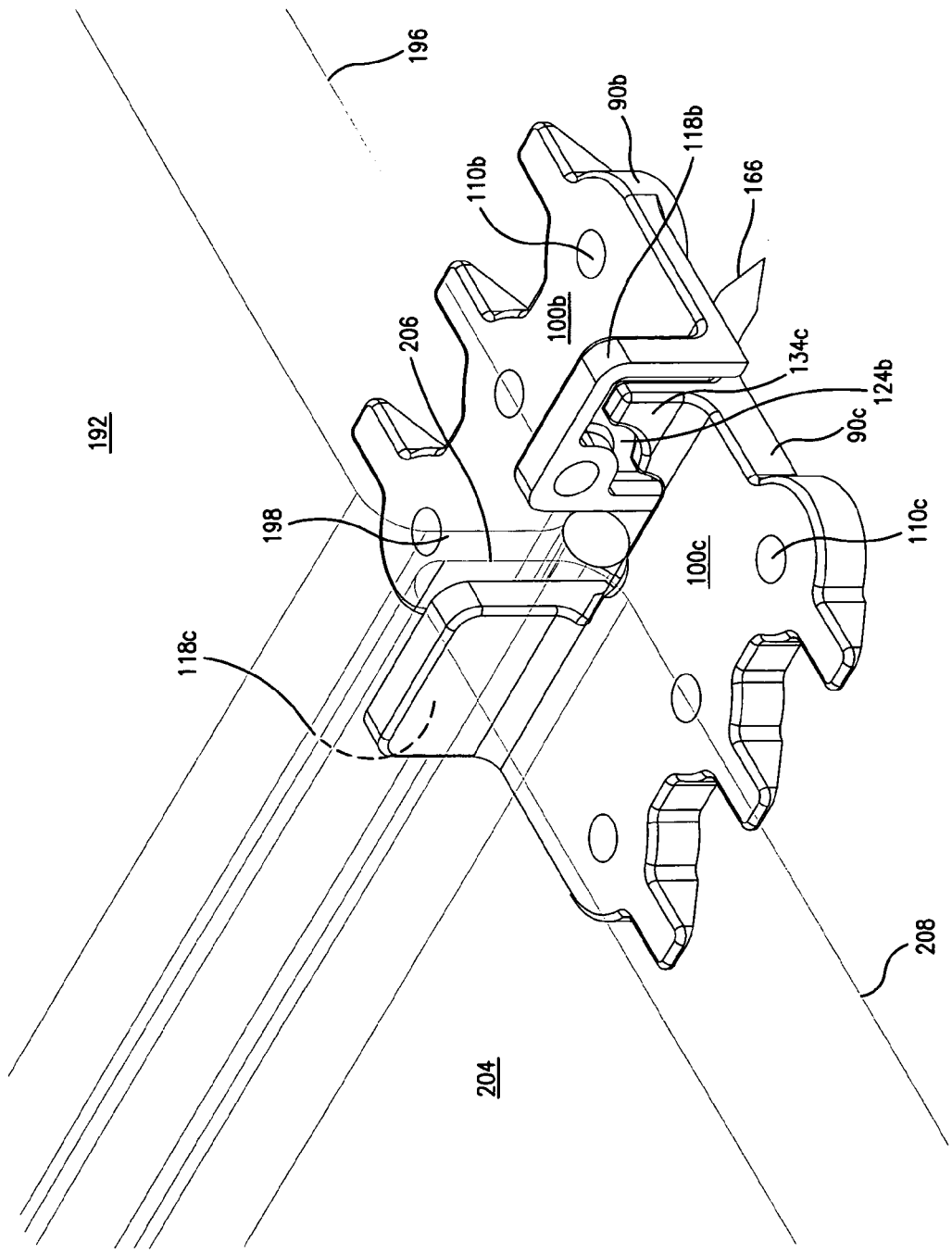
FIG. 13 is a schematic view showing two interengaged fastener system clips disposed between two adjacent cover boards.

In some instances the covering boards will not span the entire length of the framework. Thus, two covering boards may need to be disposed in end to end relationship. Typically, the ends of the covering boards are positioned over a joist for support. As shown in FIG. 13 the disclosed fastener system 2 in any embodiment may also be used to fasten adjacent covering boards disposed in such end to end relationship to a joist. Each cover board is fastened adjacent its end to the clip with a fastener (not shown) disposed through a respective base aperture 110.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed:

1. A fastener system, comprising:
   a first connector comprising:
      a base having an upper face, an opposing lower face, opposing first and second ends, and a shoulder adjacent the first end and comprising a face defining a stop cavity, the first connector defining a tab cavity therein and an aperture toward the first end connecting the upper face and the lower face; and
   a second connector, comprising:
      a base having an upper face, an opposing lower face, opposing first and second ends, a stop adjacent the first end and a tab projecting outwardly from the first end, said tab being perpendicular to said stop, the second connector defining an aperture connecting the upper face and the lower face;
   wherein the first and second connectors are selectively engagable so that the tab is positionable within the tab cavity and the stop is simultaneously positionable adjacent the shoulder within the stop cavity.

2. The fastener system of claim 1 wherein the first connector lower face has a recessed portion defining the tab cavity.

3. The fastener system of claim 1 wherein the shoulder comprises a face having opposed recessed walls and an intermediate wall extending below said opposed walls defining the stop cavity; wherein the first and second connectors are selectively engagable so that the tab is positionable within the tab cavity and the stop is positionable within the stop cavity so as to be surrounded by the opposed and intermediate walls.

4. The fastener system of claim 1 wherein the first connector comprises the shoulder and a stop adjacent the first end and a tab projecting outwardly from the first end and the aperture is defined between the shoulder and the stop; and the second connector comprises a shoulder and the stop adjacent the first end and the tab projecting outwardly from the first end and the aperture is defined between the shoulder and the stop.

5. A fastener comprising:

a shoulder member comprising:
- a base having a free end and an engagement end opposing the free end,
- a substantially planar upper face,
- a substantially planar lower face opposing the upper face,
- two shoulders projecting generally perpendicularly from the upper face and adjacent the engagement end, each shoulder defining a stop cavity therein,
- the shoulder member defining a plurality of tab cavities, an aperture toward the free edge connecting the upper face and the lower face and an aperture toward the engagement end and between the shoulders connecting the upper face and the lower face; and a tab member selectively separable from the shoulder member, comprising:
- a body having a free end and an anengagement end opposing the free end,
- a substantially planar upper face,
- a substantially planar support face opposing the upper face, two stops projecting generally perpendicularly from the upper face and adjacent the engagement end,
- two tabs projecting outwardly from the engagement end, each tab having a tab lower face and a tab upper face opposing the tab lower face,
- the tab member defining an aperture connecting the upper face and the support face;
- wherein the shoulder member and tab member are selectively engagable so that each tab is positionable within a respective tab cavity and each simultaneous stop is positionable within a respective stop cavity and each tab extends perpendicularly relative to a stop.

6. The fastener of claim 5 wherein the shoulder member and the tab member consist of a polymer.

7. The fastener of claim 5 wherein the shoulder member lower face and the tab member lower face are substantially coplanar when engaged.

* * * * *

UNITED STATES PATENT AND TRADEMARK OFFICE
CERTIFICATE OF CORRECTION

PATENT NO. : 7,516,586 B2 Page 1 of 1
APPLICATION NO. : 11/506684
DATED : April 14, 2009
INVENTOR(S) : Riccitelli It is certified that error appears in the above-identified patent and that said Letters Patent is hereby corrected as shown below:

Column 12:

Line 3, delete "anengagement" and substitute --engagement--.

Lines 6 - 8, delete

"a substantially planar support face opposing the upper
    face, two stops projecting generally perpendicularly
    from the upper face and adjacent the engagement end,"

and substitute

--a substantially planar support face opposing the upper
    face,
two stops projecting generally perpendicularly from the
    upper face and adjacent the engagement end,--.

Signed and Sealed this

Seventeenth Day of November, 2009

David J. Kappos
*Director of the United States Patent and Trademark Office*